PINCUS & EMERICK.
Coffee Pot.

No. 51,083.

Patented Nov. 21, 1865.

Witnesses:
Wm. Albert Steel.
John Parker.

Inventor
E. Pincus & Emerick
By their Attys

UNITED STATES PATENT OFFICE.

E. PINCUS AND D. B. EMERICK, OF PHILADELPHIA, PENNSYLVANIA.

IMPROVEMENT IN COFFEE-POTS.

Specification forming part of Letters Patent No. 51,083, dated November 21, 1865.

*To all whom it may concern:*

Be it known that we, E. PINCUS and D. B. EMERICK, of Philadelphia, Pennsylvania, have invented certain Improvements in Coffee and Tea Pots; and we do hereby declare the following to be a full, clear, and exact description of the same, reference being had to the accompanying drawings, and to the letters of reference marked thereon.

Our improved coffee or tea pot has an upper and lower chamber, a vessel having a perforated bottom containing the coffee or tea, a tube extending through the latter into the lower chamber, and a tube forming a communication between the two chambers, all substantially as described hereinafter, so that a thorough circulation of hot water may be maintained through the coffee or tea, and a perfect decoction of the same thereby obtained, while the milk or cream is heated in a vessel attached to that containing the tea or coffee.

In order to enable others to make and use our invention, we will now proceed to describe its construction and operation.

Figure 1:
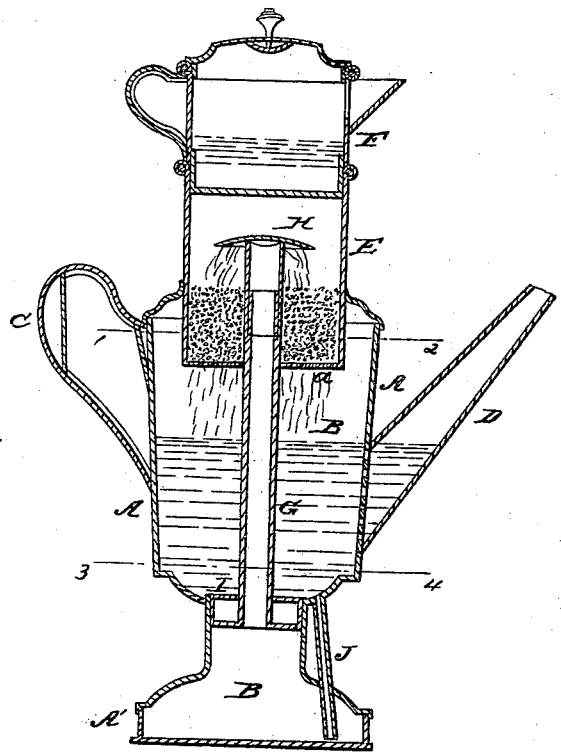
Figure 2:
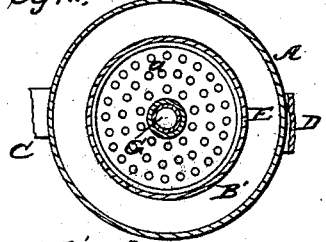
Figure 3:
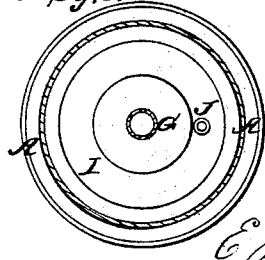

On reference to the accompanying drawings, which form a [part of this specification, Figure 1 is a sectional elevation of our improved coffee-pot; Fig. 2, a sectional plan on the line 1 2, Fig. 1; and Fig. 3, a sectional plan on the line 3 4, Fig. 1.

A is the body, and A' is the base of the pot, inclosing the two compartments B and B', which are separated from each other by the partition I, fitted to the contracted space between the body and base. The body is provided with the usual handle, C, and spout D, and into the top of the pot fits a vessel, E, which has a perforated bottom, a, a cup, F, with a detachable cover fitting into the top of the vessel E.

Through the perforated bottom a of the vessel E passes a tube, G, over the top of which is secured a deflecting-plate, H, the tube being so cut away as not to be entirely closed at the top, the lower end of the tube passing through and being secured to the partition I. A tube, J, forms a communication between the chamber B' and chamber B, the tube extending nearly to the bottom of this chamber.

A proper quantity of water is poured into the body of the pot, the ground coffee is placed in the vessel E, the cream to be used with the coffee is introduced into the cup F, and the pot is then placed over the spirit-lamp or on a stove. As the water in the chamber B becomes heated the steam from the same is brought into contact with the coffee in the vessel E, partially softens the latter, and prepares it to readily yield up its soluble portions. As the heat increases and the water is brought to the boiling-point it rises in the tube G and impinges against the under side of the plate H, the latter directing it onto the coffee, through which it percolates into the chamber B', and through the tube J into the chamber B, where it is reheated and again projected upward through the tube G and over the coffee in the vessel, as before. As the circulation of the water is continued, every portion while in a heated state will be brought in contact with the coffee, and a thorough extract of the latter will be obtained.

It will be seen that the cream is heated at the same time as the coffee, ready for use when the coffee is prepared, the cup F taking no space on the stove, and requiring no extra heating apparatus—a matter of considerable importance when small stoves or spirit-lamps are used.

We claim as our invention and desire to secure by Letters Patent—

1. The combination of the chambers B and B', partition I, vessel E, pipe G, and tube J or its equivalent, the whole being arranged and operating substantially as and for the purpose herein set forth.

2. The combination described of the vessel E with the vessel F, for the purpose specified.

In testimony whereof we have signed our names to this specification in the presence of two subscribing witnesses.

E. PINCUS.
DANIEL B. EMERICK.

Witnesses:
   CHARLES E. FOSTER,
   W. W. DOUGHERTY.